(12) United States Patent
Hashizume (10) Patent No.: US 10,306,159 B2
(45) Date of Patent: May 28, 2019

(54) CONTINUOUS OUTPUT OF FRAMES WITH CONSTANT FRAME RATE

(71) Applicant: SONY CORPORATION, Tokyo (JP)

(72) Inventor: Jun Hashizume, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/125,746

(22) PCT Filed: Mar. 13, 2015

(86) PCT No.: PCT/JP2015/057529
§ 371 (c)(1),
(2) Date: Sep. 13, 2016

(87) PCT Pub. No.: WO2015/146643
PCT Pub. Date: Oct. 1, 2015

(65) Prior Publication Data
US 2017/0013208 A1 Jan. 12, 2017

(30) Foreign Application Priority Data
Mar. 26, 2014 (JP) .................................. 2014-064008

(51) Int. Cl.
*H04N 5/335* (2011.01)
*H04N 3/14* (2006.01)
(Continued)

(52) U.S. Cl.
CPC ......... *H04N 5/343* (2013.01); *H04N 5/23245* (2013.01)

(58) Field of Classification Search
None
See application file for complete search history.

(56) References Cited

U.S. PATENT DOCUMENTS

2007/0030535 A1* 2/2007 Kang ....................... G09G 5/39
358/505
2008/0291304 A1* 11/2008 Ota ................... H01L 27/14603
348/294

FOREIGN PATENT DOCUMENTS

JP 2006-197097 A 7/2006
JP 2007-150448 A 6/2007
(Continued)

OTHER PUBLICATIONS

International Search Report and Written Opinion of PCT Application No. PCT/JP2015/057529, dated May 19, 2015, 7 pages of English Translation and 7 pages of ISRWO.
(Continued)

*Primary Examiner* — Stephen P Coleman
(74) *Attorney, Agent, or Firm* — Chip Law Group (57) ABSTRACT

The present disclosure relates to an image sensor that includes a pixel unit, a memory, a control unit, and a detection unit. The pixel unit has a plurality of reading modes and generates image data in accordance with incident light. The memory has a capacity capable of storing the image data equivalent to at least two or more frames. The control unit simultaneously performs processing for storing the image data input from the pixel unit in a different region in the memory for each frame, and processing for reading the image data from the region where previous storage has been performed. The detection unit detects a change in the reading mode in the pixel unit. The present disclosure can be applied to an electronic device having an image capturing function.

4 Claims, 13 Drawing Sheets

(51) Int. Cl.
*H04N 5/343* (2011.01)
*H04N 5/232* (2006.01)

(56) References Cited

FOREIGN PATENT DOCUMENTS

| JP | 2012-54876 A | 3/2012 |
| JP | 2012-054876 A | 3/2012 |
| JP | 2012-151787 A | 8/2012 |

OTHER PUBLICATIONS

International Preliminary Report on Patentability of PCT Application No. PCT/JP2015/057529, dated Sep. 27, 2016, pp. 5.

* cited by examiner

| OUTPUT FROM PIXEL UNIT | FIRST BUFFER | SECOND BUFFER | READING OUTPUT |
|---|---|---|---|
| ⋮ | ⋮ | ⋮ | ⋮ |
| F10 | F9 | F10 | F9 |
| F9 | F9 | F8 | F8 |
| F8 | F7 | F8 | F7 |
| F7 | F7 | F6 | F6 |
| F6 | F4 | F6 | F4 |
| ×F5 | F4 | F3 | F4 |
| F4 | F4 | F3 | F3 |
| F3 | F2 | F3 | F2 |
| F2 | F2 | F1 | F1 |
| F1 | F0 | F1 | F0 |
| F0 | F0 | | |

| OUTPUT FROM PIXEL UNIT | FIRST BUFFER | SECOND BUFFER | READING OUTPUT |
|---|---|---|---|
| ⋮ | ⋮ | ⋮ | ⋮ |
| F10 | F9 | F10 | F10 |
| F9 | F9 | F8 | F9 |
| F8 | F7 | F8 | F8 |
| F7 | F7 | F6 | F7 |
| F6 | F4 | F6 | F6 |
| ×F5 | F4 | F3 | F4 |
| F4 | F4 | F3 | F4 |
| F3 | F2 | F3 | F3 |
| F2 | F2 | F1 | F2 |
| F1 | F0 | F1 | F1 |
| F0 | F0 |  | F0 |

FIG. 13

CONTINUOUS OUTPUT OF FRAMES WITH CONSTANT FRAME RATE

CROSS REFERENCE TO RELATED APPLICATIONS

This application is a U.S. National Phase of International Patent Application No. PCT/JP2015/057529 filed on Mar. 13, 2015, which claims priority benefit of Japanese Patent Application No. JP 2014-064008 filed in the Japan Patent Office on Mar. 26, 2014. Each of the above-referenced applications is hereby incorporated herein by reference in its entirety.

TECHNICAL FIELD

The present disclosure relates to an image sensor and an electronic device, and particularly to an image sensor and an electronic device configured to be able to output a dummy frame instead of a corrupt frame which may occur by changing a reading mode.

BACKGROUND ART

Conventionally, an image sensor has a plurality of reading modes (such as an addition reading mode and an HDR reading mode), and in some image sensors, the modes can be switched while capturing an image (for example, see Patent Document 1).

Meanwhile, in a case where a reading mode is changed in an image sensor, a shutter speed (exposure time) and time for reading pixel data (hereinafter also referred to as frame) are also changed. Consequently, there occurs, at timing of changing the reading mode, a corrupt frame which cannot be used as an image since exposure time for respective pixels is not uniform.

Figure 1:
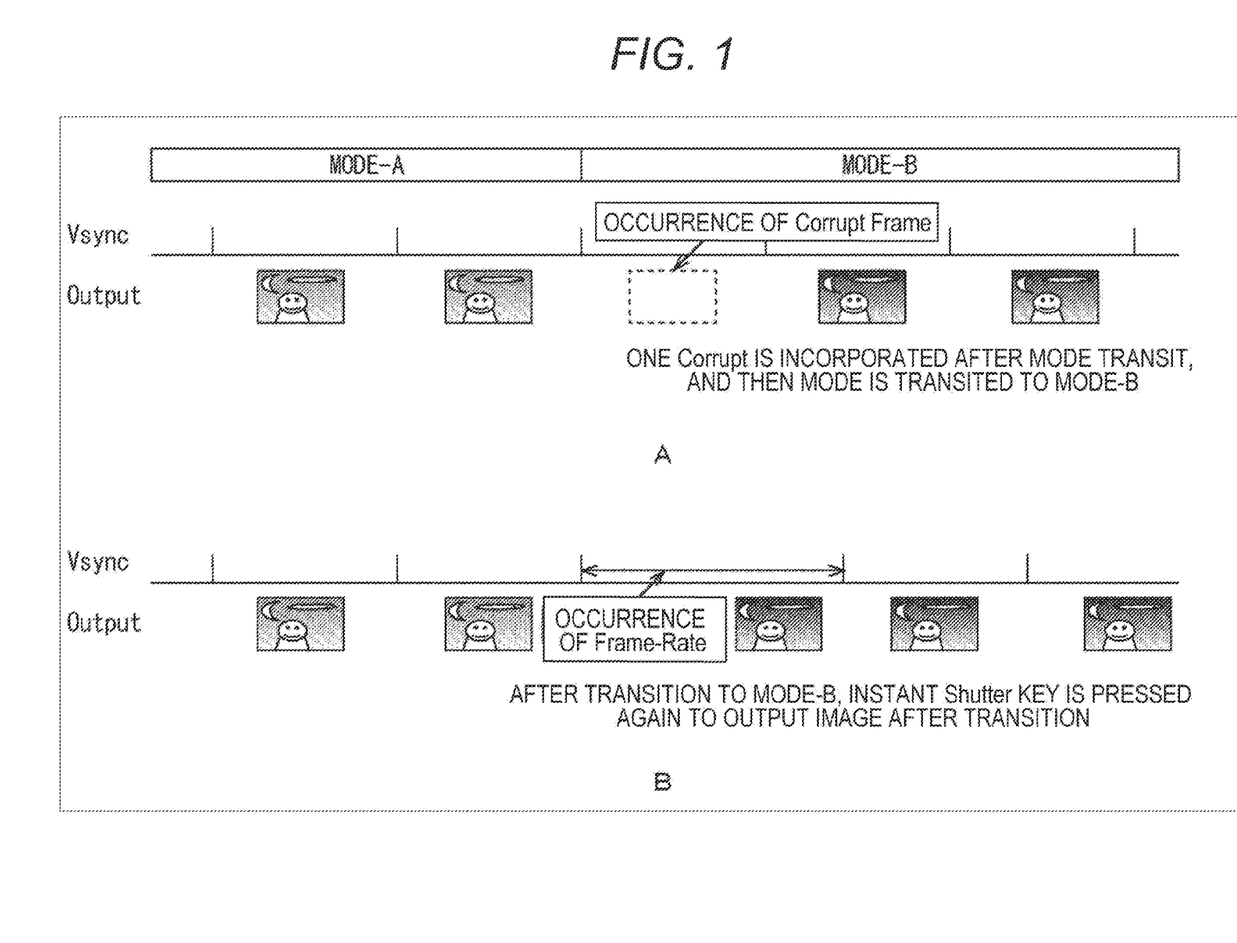
FIG. 1 is a drawing for explaining a conventional method for coping with corrupt frames.

FIG. 1 illustrates a conventional method for coping with corrupt frames.

In other words, as illustrated in A in the figure, a first coping method is a method in which a corrupt frame, which may occur when a reading mode A (MODE-A) is changed to a reading mode B (MODE-B), is not output to a succeeding stage. According to the first coping method, it is possible to always output to a succeeding stage only a frame which can be used as an image. However, in the first coping method, output of frames is interrupted by one frame, and there is a demand to continuously output frames as long as it is possible. Accordingly, there is a second method of interest to meet the demand.

As illustrated in B in the figure, the second coping method is a method in which a frame synchronization signal (Vsync) is sent again when the reading mode A (MODE-A) is changed to the reading mode B (MODE-B).

CITATION LIST

Patent Document

Patent Document 1: Japanese Patent Application Laid-Open No. 2007-150448

SUMMARY OF THE INVENTION

Problems to be Solved by the Invention

According to the second coping method, it is possible to continuously output frames which can be used as an image. However, in that case, a frame rate is temporarily disturbed.

The present disclosure has been made in view of the above circumstance, and makes it possible to continuously output frames which can be used as an image without disturbing a frame rate.

Solutions to Problems

An image sensor of an aspect of the present disclosure includes a pixel unit, a memory, a control unit, and a detection unit. The pixel unit has a plurality of reading modes and generates image data in accordance with incident light. The memory has a capacity capable of storing the image data equivalent to at least two or more frames. The control unit simultaneously performs processing for storing the image data input from the pixel unit in a different region in the memory for each frame, and processing for reading the image data from the region where the previous storage has been performed. The detection unit detects a change in the reading mode in the pixel unit.

When the detection unit detects a change in the reading mode, the control unit can stop processing for storing, in the memory, the image data input from the pixel unit.

When the detection unit detects a change in the reading mode, the control unit can stop processing for storing, in the memory, the image data of a corrupt frame input from the pixel unit.

When the detection unit detects a change in the reading mode, the control unit can perform processing for again reading the image data which has been read from the region in the memory where the image data has been previously stored.

The memory may include a first buffer and a second buffer each of which can store the image data equivalent to one frame. The control unit can simultaneously perform processing for storing the image data input from the pixel unit in one of the first buffer and the second buffer in the memory for each frame, and processing for reading the image data from the other of the first buffer and the second buffer.

In an electronic device of a second aspect of the present disclosure, an image sensor is mounted which includes a pixel unit, a memory, a control unit, and a detection unit. The pixel unit has a plurality of reading modes and generates image data in accordance with incident light. The memory has a capacity capable of storing the image data equivalent to at least two or more frames. The control unit simultaneously performs processing for storing the image data input from the pixel unit in a different region in the memory for each frame, and processing for reading the image data from the region where the previous storage has been performed. The detection unit detects a change in the reading mode in the pixel unit.

In the first and the second aspects of the present disclosure, processing for storing image data input from a pixel unit in a different region in a memory for each frame, and processing for reading the image data from the region where the previous storage has been performed are performed simultaneously. In addition, a change in a reading mode in a pixel unit is detected.

Effects of the Invention

According to the first and the second aspects of the present disclosure, it is possible to continuously output frames which can be used as an image without disturbing a frame rate.

MODE FOR CARRYING OUT THE INVENTION

Hereinbelow, a best mode for carrying out the present disclosure (hereinafter referred to as embodiment) will be described. However, prior thereto, a summary of the present disclosure will be described.

<Summary of Operation of Image Sensor as Embodiment of Present Disclosure>

Figure 2:
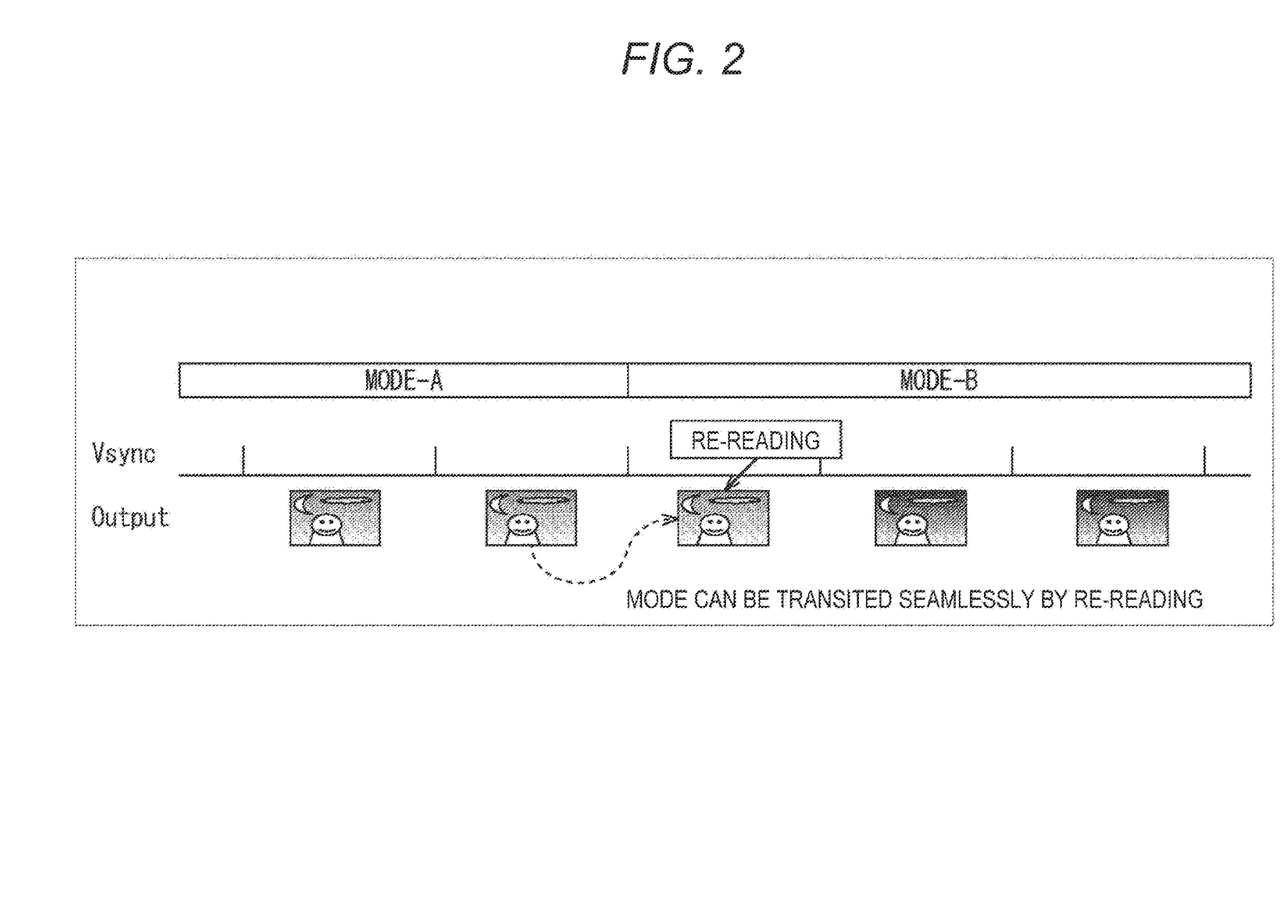
FIG. 2 is a drawing for explaining a summary of an operation of an image sensor to which the present disclosure is applied.

FIG. 2 illustrates a summary of an operation of an image sensor, which is an embodiment of the present disclosure.

As with the case of the conventional image sensors described above, in the image sensor, a plurality of reading modes (such as an addition reading mode and an HDR reading mode) is switched while capturing an image and a frame is output to a succeeding stage.

In addition, the image sensor is configured to again read and output, as a dummy frame, a frame which has been already output and stored in a memory (multiple frame-storing memory 13 in FIG. 3) in the image sensor, instead of outputting a corrupt frame which may occur at timing when a reading mode is changed, to a succeeding stage. By doing so, it is realized that the image sensor continuously outputs frames which can be used as an image without disturbing a frame rate.

<1. Configuration Example of Image Sensor, which is Embodiment of Present Disclosure>

Figure 3:
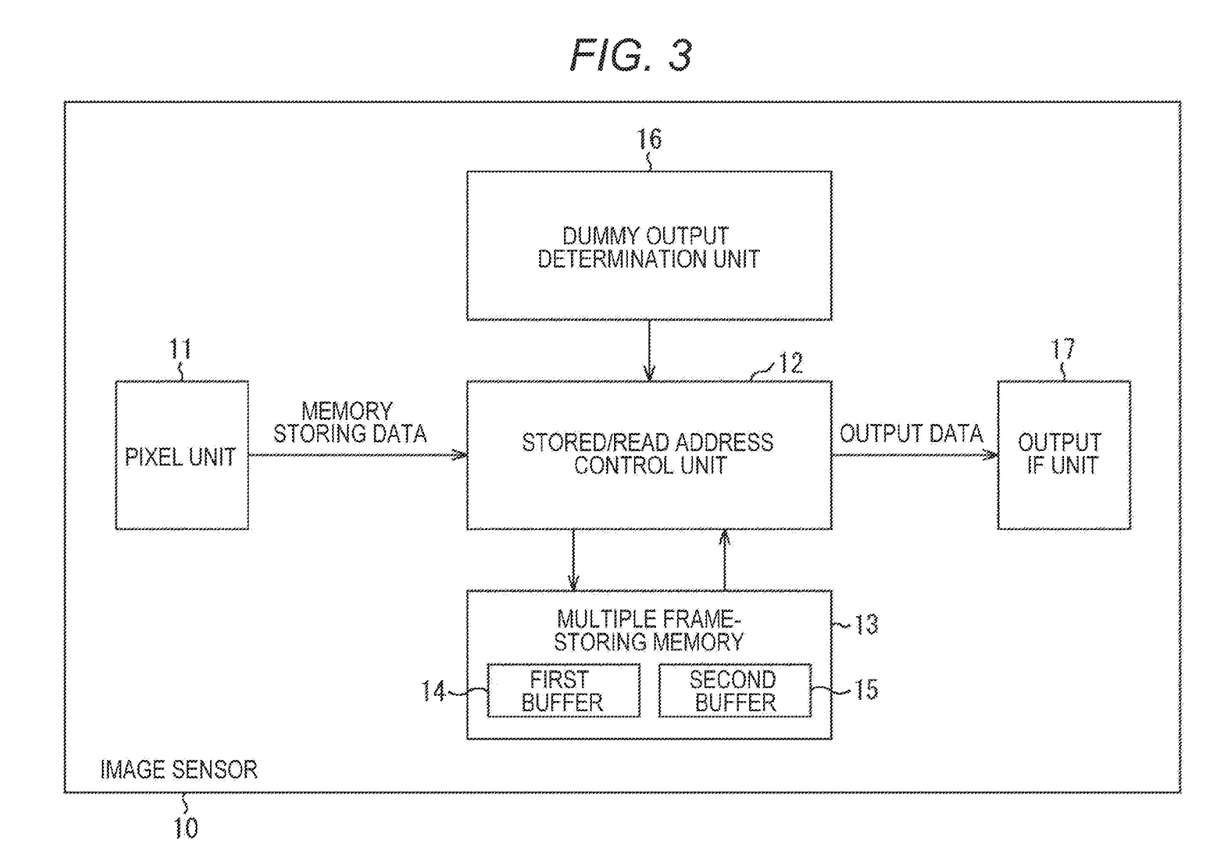
FIG. 3 is a block diagram illustrating a configuration example of the image sensor to which the present disclosure is applied.

FIG. 3 illustrates a configuration example of an image sensor, which is an embodiment of the present disclosure.

The image sensor 10 includes a pixel unit 11, a stored/read address control unit 12, a multiple frame-storing memory 13, a dummy output determination unit 16, and an output I/F unit 17.

The pixel unit 11 includes a number of light-receiving elements disposed in all directions, and in accordance with a predetermined frame rate, outputs a pixel signal generated in accordance with incident light in each light-receiving element to the stored/read address control unit 12 for each row, as memory storing data. Note that it is assumed that a shutter speed (exposure time) and time for reading the generated pixel signal in each light-receiving element in the pixel unit 11 are changed in accordance with a set reading mode.

The stored/read address control unit 12 can separately control a stored address and a read address with respect to the multiple frame-storing memory 13, and simultaneously executes processing for storing memory storing data (hereinafter also referred to as frame) from the pixel unit 11 in the multiple frame-storing memory 13, and processing for reading a frame stored in the multiple frame-storing memory 13 and outputting the frame to the output I/F unit 17. In addition, the stored/read address control unit 12 can perform front end processing with respect to the memory storing data from the pixel unit 11 and back end processing of the memory storing data stored in the multiple frame-storing memory 13.

Furthermore, in accordance with a notice from the dummy output determination unit 16, the stored/read address control unit 12 stops storage of a corrupt frame which may be input from the pixel unit 11 as memory storing data, in the first buffer 14 and the second buffer 15 in the multiple frame-storing memory 13.

Note that the stored/read address control unit 12 may be separated into a stored address control unit and a read address control unit.

The multiple frame-storing memory 13 has a capacity capable of storing memory storing data equivalent to at least two frames. In a case of the embodiment, the multiple frame-storing memory 13 includes the first buffer 14 and the second buffer 15 which have a capacity equivalent to one frame, respectively.

Accordingly, the stored/read address control unit 12 can simultaneously perform processing for storing the memory storing data in one of the first buffer 14 and the second buffer 15 in the multiple frame-storing memory 13, and processing for reading the memory storing data from the other thereof to output the memory storing data to the output I/F unit 17. In addition, the stored/read address control unit 12 can simultaneously perform processing for storing the memory storing data in the first buffer 14 in the multiple frame-storing memory 13, and processing for reading the memory storing data from the first buffer 14 to output the memory storing data to the output I/F unit 17. The same holds for the second buffer 15.

The dummy output determination unit 16 detects a change in a reading mode in the image sensor 10 which may cause input of a corrupt frame from the pixel unit 11, and notifies the stored/read address control unit 12 of a detection result.

The output I/F unit 17 outputs, to a succeeding stage, a frame input as output data from the stored/read address control unit 12.

<Control of Stored/Read Address Control Unit 12>

Figure 4:
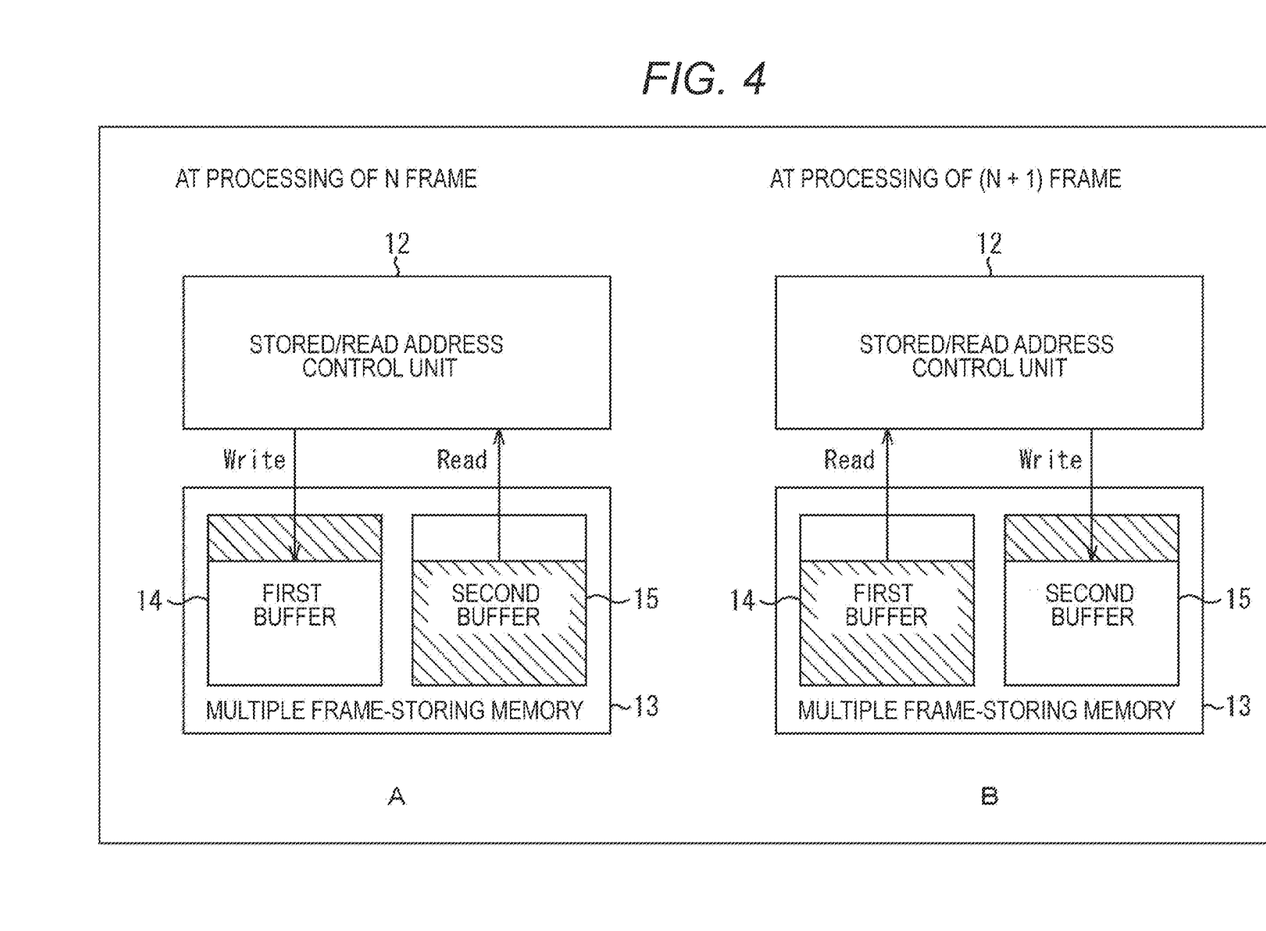
FIG. 4 is a diagram illustrating a situation where control is performed by a stored/read address control unit.

Next, FIG. 4 illustrates a situation where control is performed by the stored/read address control unit 12 when an N-th frame is input from the pixel unit 11 and when an (N+1)-th frame is input therefrom.

When the N-th frame is input, as illustrated in A in the figure, the stored/read address control unit 12 stores the N-th frame in, between the first buffer 14 and the second buffer 15 in the multiple frame-storing memory 13, the other (assumed to be the first buffer 14) which is different from the one where the previous storage has been performed. Simultaneously therewith, the frame is read, which frame has been stored in the one (the second buffer 15) where the previous storage has been performed.

Next, when the N+1-th frame is input, as illustrated in B in the figure, the stored/read address control unit 12 stores the N+1-th frame in, between the first buffer 14 and the second buffer 15 in the multiple frame-storing memory 13, the other (the second buffer 15) which is different from the one where the previous storage has been performed. Simultaneously therewith, the frame is read, which frame has been stored in the one (the first buffer 14) where the previous storage has been performed.

In other words, the stored/read address control unit 12 stores the frames alternately in the first buffer 14 and the second buffer 15 in the multiple frame-storing memory 13. Then, reading is performed from the buffer where storage of the frame is not performed this time (the buffer where the previous storage has been performed).

Figure 5:
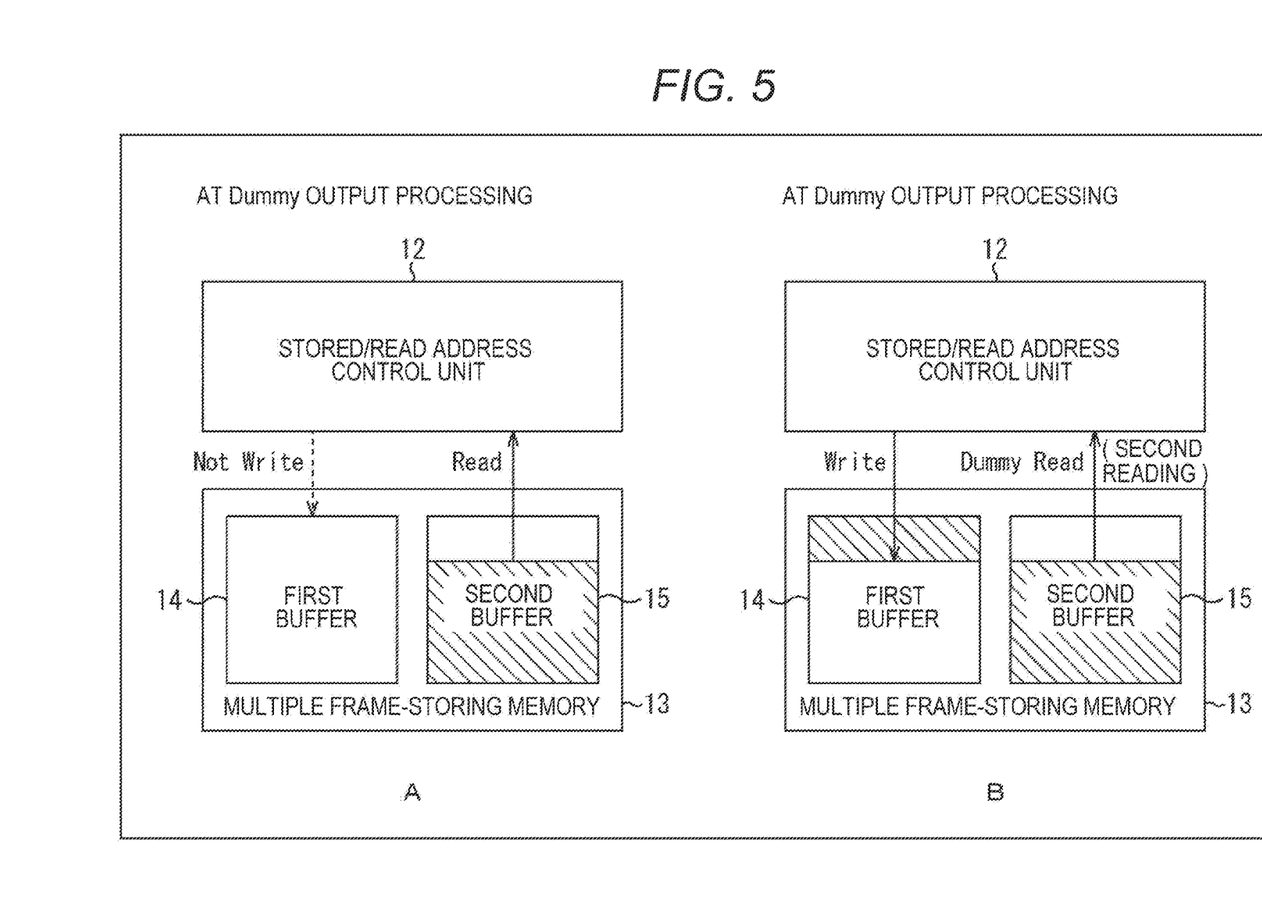
FIG. 5 is a diagram illustrating a situation where control is performed by the stored/read address control unit.

Next, FIG. 5 illustrates a situation where control is performed by the stored/read address control unit 12 when a change in a reading mode in the image sensor 10 is detected by the dummy output determination unit 16.

When a change in the reading mode is detected, as illustrated in A in the figure, since a corrupt frame may be input from the pixel unit 11, the stored/read address control unit 12 does not store this in either the first buffer 14 or the second buffer 15. In this regard, however, the frame is read, which frame has been stored in the one (in the current case, the second buffer 15) where the previous storage has been performed.

Then, when the next frame is input, as illustrated in B in the figure, the stored/read address control unit 12 stores the frame in, between the first buffer 14 and the second buffer 15 in the multiple frame-storing memory 13, the other (the first buffer 14) which is different from the one where the previous storage has been performed. Simultaneously therewith, the frame which has been stored in the one (the second buffer 15) where the previous storage has been performed, and has been already read, is again read as a dummy frame.

With the control of the stored/read address control unit 12 described above, it is possible to continuously output frames which can be used as an image without disturbing a frame rate, although the same frames may be successively output.

<Frame Output Processing of Image Sensor 10>

Figure 6:
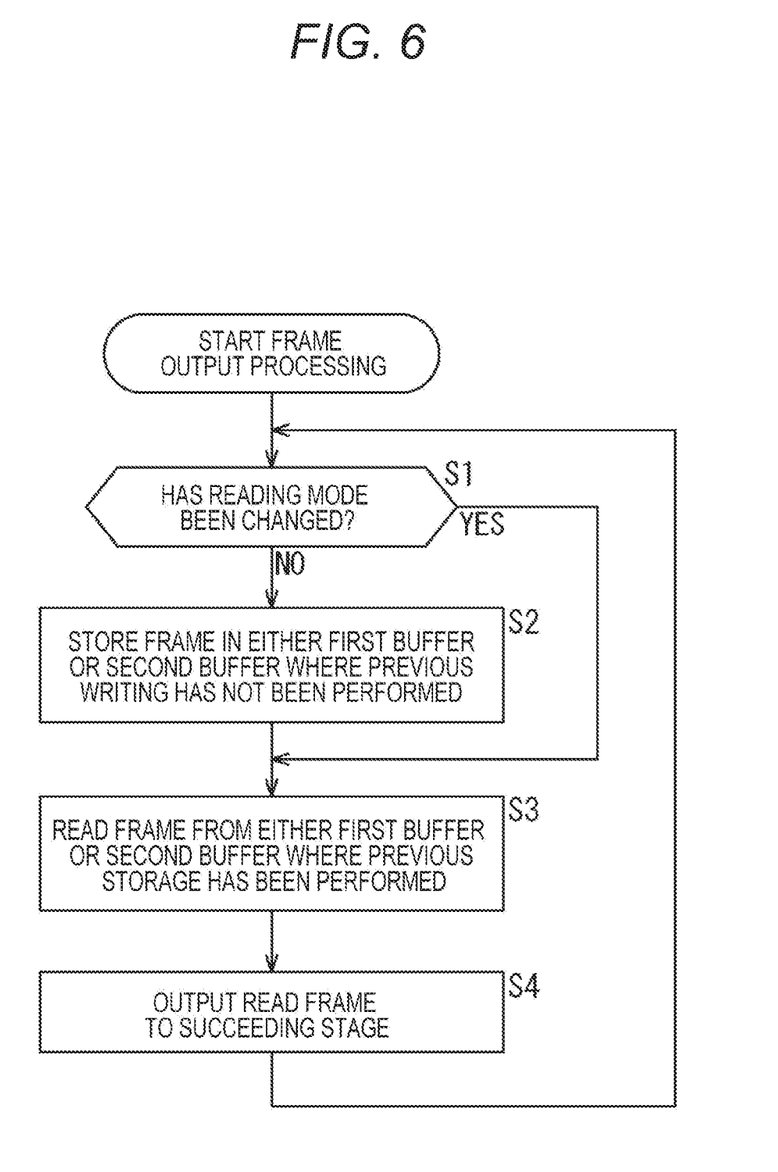
FIG. 6 is a flowchart for explaining frame output processing.

Next, FIG. 6 is a flowchart for explaining frame output processing of the image sensor 10.

It is assumed that memory storing data (in some cases, a corrupt frame) is input from the pixel unit 11 to the stored/read address control unit 12 at a predetermined frame rate, and this frame output processing is executed for each frame.

When the dummy output determination unit 16 detects a change in a reading mode in the image sensor 10 in Step S1, a notice indicative thereof is output to the stored/read address control unit 12. In a case where there is no notice of a change in the reading mode from the dummy output determination unit 16, in other words, in a case where there is no change in the reading mode, the stored/read address control unit 12 moves the processing to Step S2.

In Step S2, the stored/read address control unit 12 stores a frame input from the pixel unit 11 in, between the first buffer 14 and the second buffer 15 in the multiple frame-storing memory 13, the other which is different from the one where the previous storage has been performed. The one is, for example, assumed to be the second buffer 15, and the other is, in the current example, the first buffer 14. Simultaneously therewith, as Step S3, the stored/read address control unit 12 reads a frame stored in the one (in this example, the second buffer 15) where the previous storage has been performed, and outputs the frame to the output I/F unit 17.

In Step S4, the output I/F unit 17 outputs, to a succeeding stage, the frame input from the stored/read address control unit 12.

Thereafter, with respect to a frame subsequently input from the pixel unit 11, processing is performed by repeating Step S1 and the subsequent steps.

Then, when the dummy output determination unit 16 detects a change in the reading mode in the image sensor 10 in Step S1, and the stored/read address control unit 12 is notified thereof, the stored/read address control unit 12 skips Step S2 and moves the processing to Step S3. In other words, the stored/read address control unit 12 does not store a corrupt frame input from the pixel unit 11 in either the first buffer 14 or the second buffer 15, and performs only reading.

The description of the frame output processing of the image sensor 10 has been completed.

Figure 7:
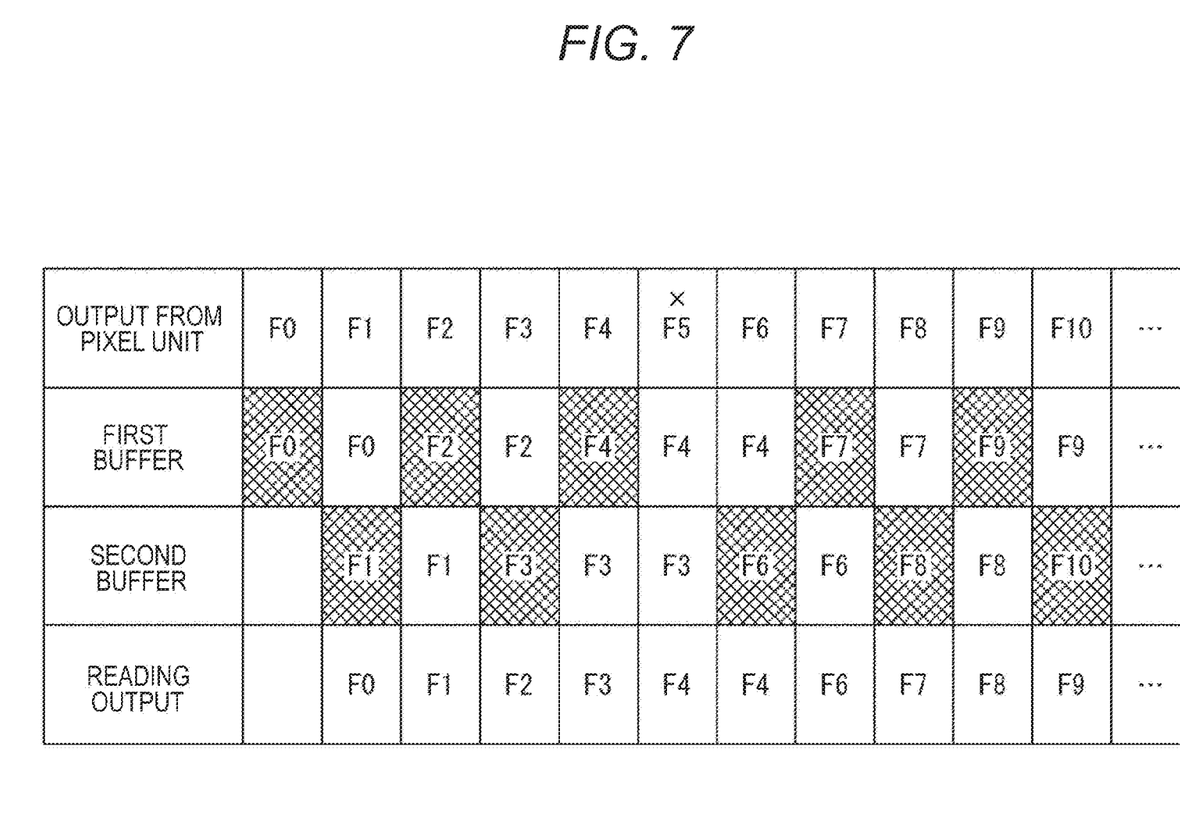
FIG. 7 is a drawing for illustrating an example of a result of the frame output processing.

FIG. 7 illustrates an example of a result of the frame output processing described above. In the example illustrated in FIG. 7, frames F0, F1, F2, . . . are sequentially input from the pixel unit 11 to the stored/read address control unit 12. In this regard, however, a frame F5 is assumed to be a corrupt frame. In addition, in the figure, a reticulate pattern means storage of the frame in the buffer.

For example, when a frame F2 is input, the frame F2 is stored in the first buffer 14, and simultaneously therewith, a frame F1 is read and output from the second buffer 15. Next, when a frame F3 is input, the frame F3 is stored in the second buffer 15, and simultaneously therewith, the frame F2 is read and output from the first buffer 14. Next, when a frame F4 is input, the frame F4 is stored in the first buffer 14, and simultaneously therewith, the frame F3 is read and output from the second buffer 15.

Next, when a corrupt frame F5 is input, the corrupt frame F5 is not stored in either the first buffer 14 or the second buffer 15, and the frame F4 is read and output from the first buffer 14 where the previous storage has been performed. Next, when a frame F6 is input, the frame F6 is stored in the second buffer 15, and simultaneously therewith, the frame F3 is read and output again from the first buffer 14. Thereafter, storage and reading are performed simultaneously in a similar manner.

However, the frame F3 may be read and output again from the second buffer 15 when the corrupt frame F5 is input.

<Other Operation Example of Frame Output Processing>

Figure 10:
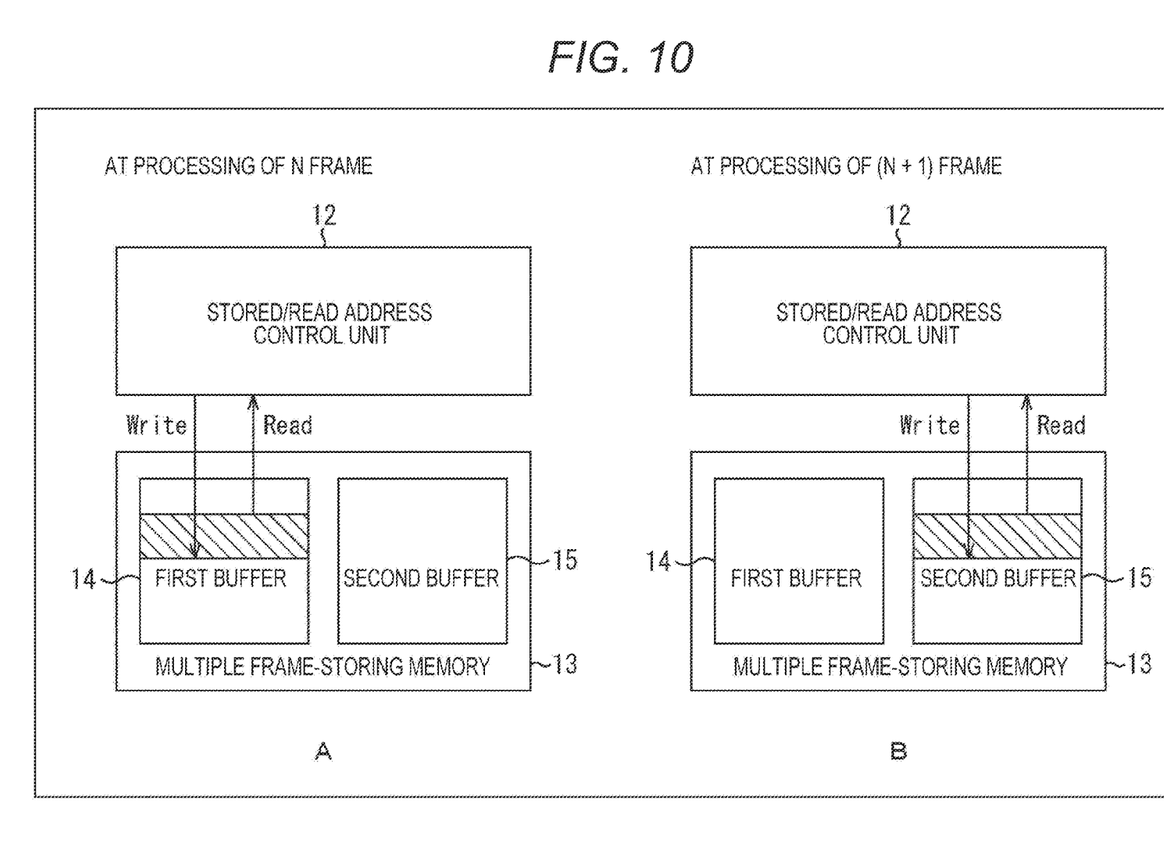
FIG. 10 is a diagram illustrating a situation where other operation in the frame output processing is performed.
Figure 11:
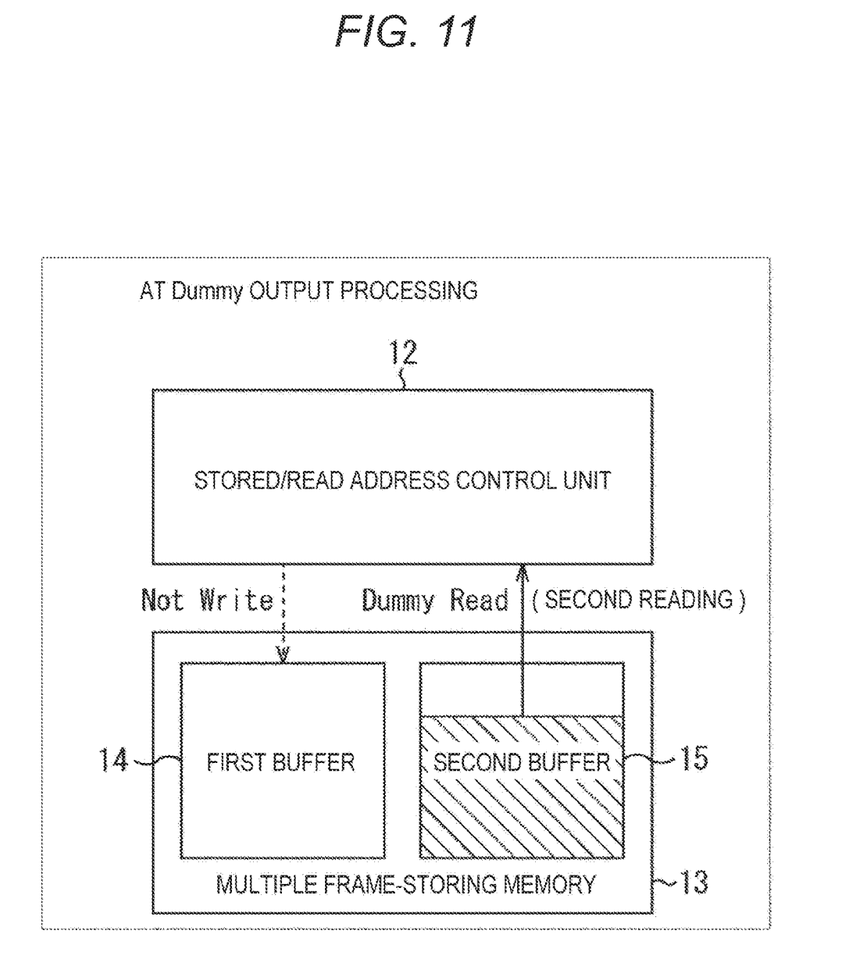
FIG. 11 is a diagram illustrating a situation where other operation in the frame output processing is performed.
Figure 12:
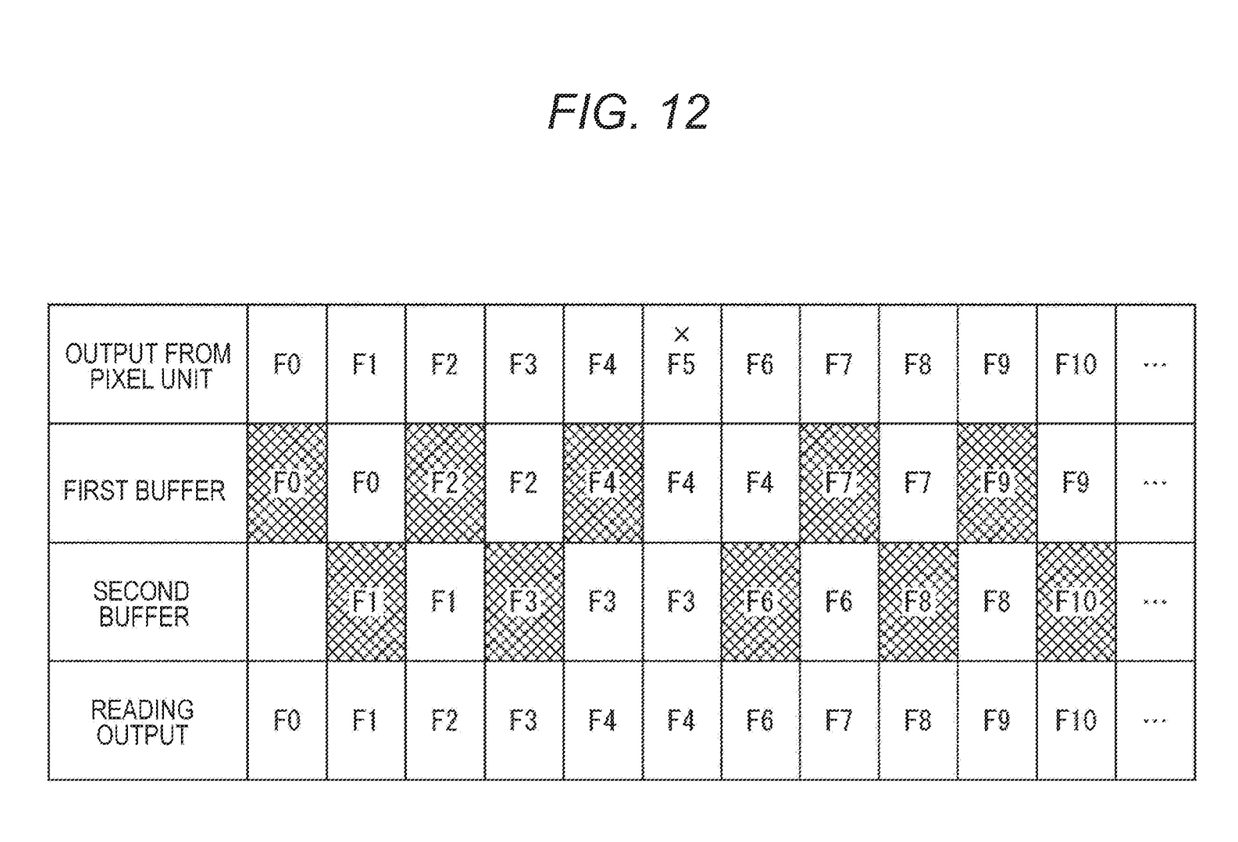
FIG. 12 is a drawing for illustrating an example of a result of other operation in the frame output processing.

FIGS. 10 and 11 illustrate situations of other operation examples of the frame output processing. FIG. 12 illustrates an example of a result of other operation example of the frame output processing.

In the frame output processing described with reference to FIGS. 4 to 7, storage in one of the first buffer 14 and the second buffer 15 and reading from the other thereof are simultaneously performed. In other operation examples, as illustrated in FIGS. 10 and 11, storage in one of the first buffer 14 and the second buffer 15 and reading from the one may be simultaneously performed. In that case, as illustrated in FIG. 12, a frame output from the pixel unit 11 can be output to a succeeding stage without a delay equivalent to one frame.

<Example of Practical Use of Image Sensor 10>

Next, a case will be described where the image sensor 10 is applied to an image capturing device having a FAST auto focus (AF) function and the like.

Here, the FAST AF will be described. Conventionally, the FAST AF is realized by Contrast AF, and on the basis of a plurality of (about 30) frames obtained by a high-speed shutter at about 120 fps while changing focus, the focus is determined. Specifically, immediately after activation, FAST AF is performed, and then preview display is started. In accordance with a shutter operation which a user executes while viewing the preview display, the FAST AF is performed again, and a frame with determined focus is output to a succeeding stage and recorded. However, conventionally, while the FAST AF is being executed, a (decimated) frame for a preview cannot be output from the image sensor to a succeeding stage, and blackout occurs in the preview display.

In contrast with this, the image sensor 10 which is the embodiment can realize the preview display even when the FAST AF is being performed. Specifics thereof are as illustrated in FIGS. 8 and 9.

Figure 8:
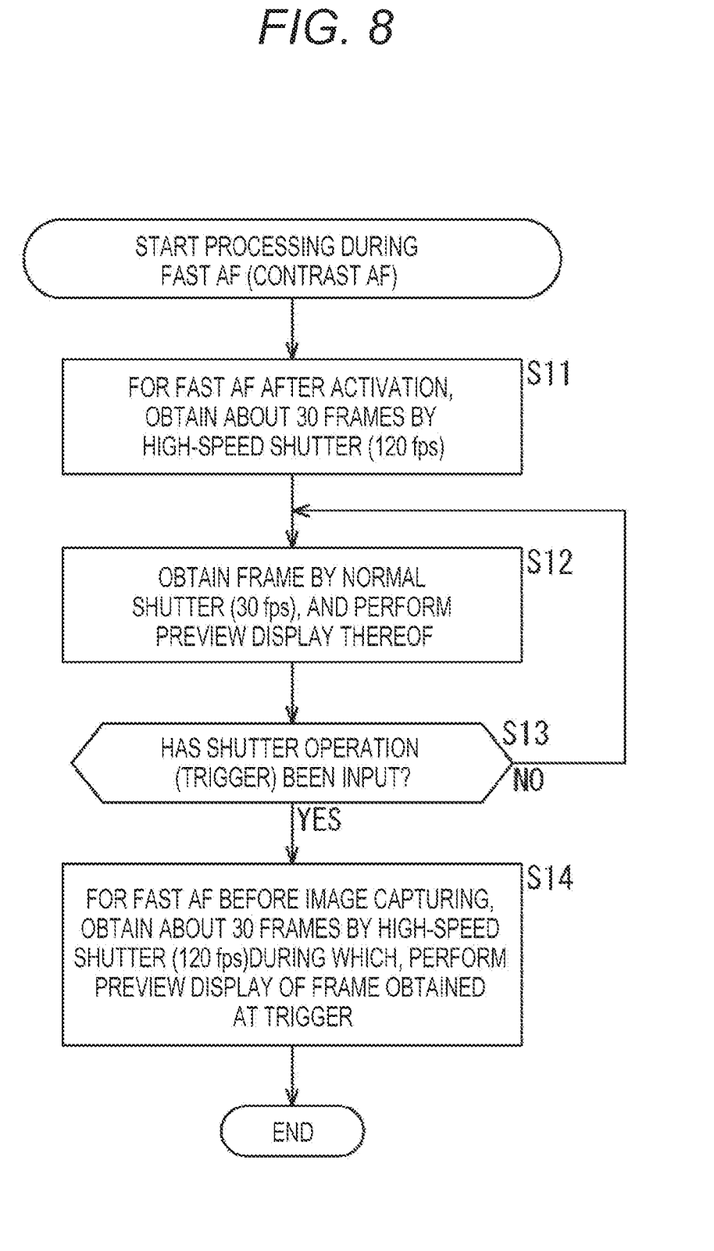
FIG. 8 is a flowchart for explaining processing performed during FAST AF.
Figure 9:
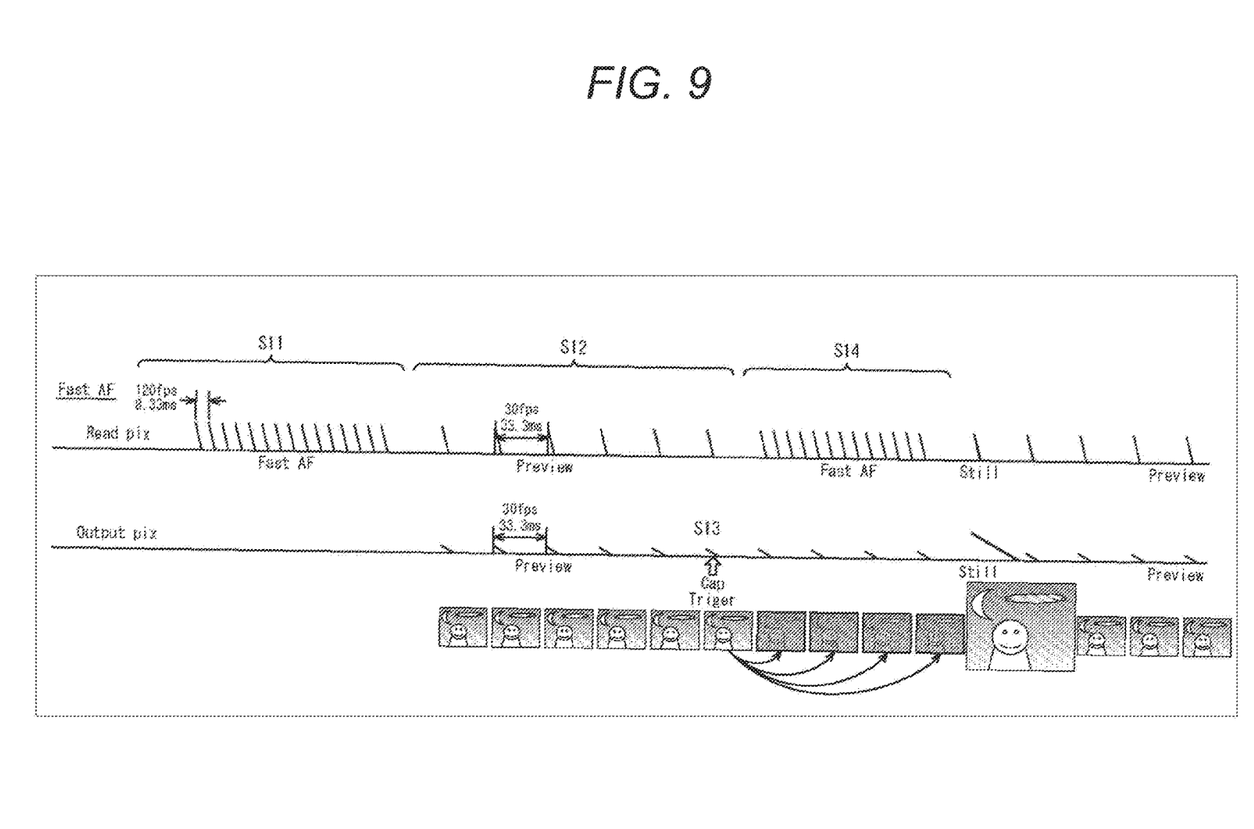
FIG. 9 is a drawing for explaining the processing performed during the FAST AF.

FIG. 8 is a flowchart for explaining processing performed by the image sensor 10 during the FAST AF. FIG. 9 is a drawing supplementary to FIG. 8, and reference signs (such as S11) therein correspond to processing steps in FIG. 8.

In Step S11, for the FAST AF after activation, a plurality of (about 30) frames is obtained by a high-speed shutter at about 120 fps while changing the focus, and output to a succeeding stage. Next, in Step S12, a frame for preview display is obtained by a normal shutter (30 fps), and output to a succeeding stage. At that time, the frame for the preview is alternately stored in and read from the first buffer 14 and the second buffer 15 of the multiple frame-storing memory 13.

In Step S13, it is confirmed whether a shutter operation has been performed, and S12 and S13 are repeated until the shutter operation is performed. In a case where the shutter operation has been performed, the processing is moved to Step S14.

In Step S14, for the FAST AF for capturing an image, about 30 frames are obtained by the high-speed shutter while changing the focus, and output to a succeeding stage. At that time, the frame for the preview remained in the first buffer 14 or the second buffer 15 is read again and output to a succeeding stage.

By the processing performed during the FAST AF described above, an image capturing device equipped with the image sensor 10 can continue preview display and prevent blackout from occurring even when the FAST AF is being performed.

<Example of Application of Image Sensor 10>

The image sensor 10 which is the embodiment described above can be applied to any electronic device having an image capturing function or a sensing function.

<Other Configuration Example of Image Sensor 10>

Figure 13:
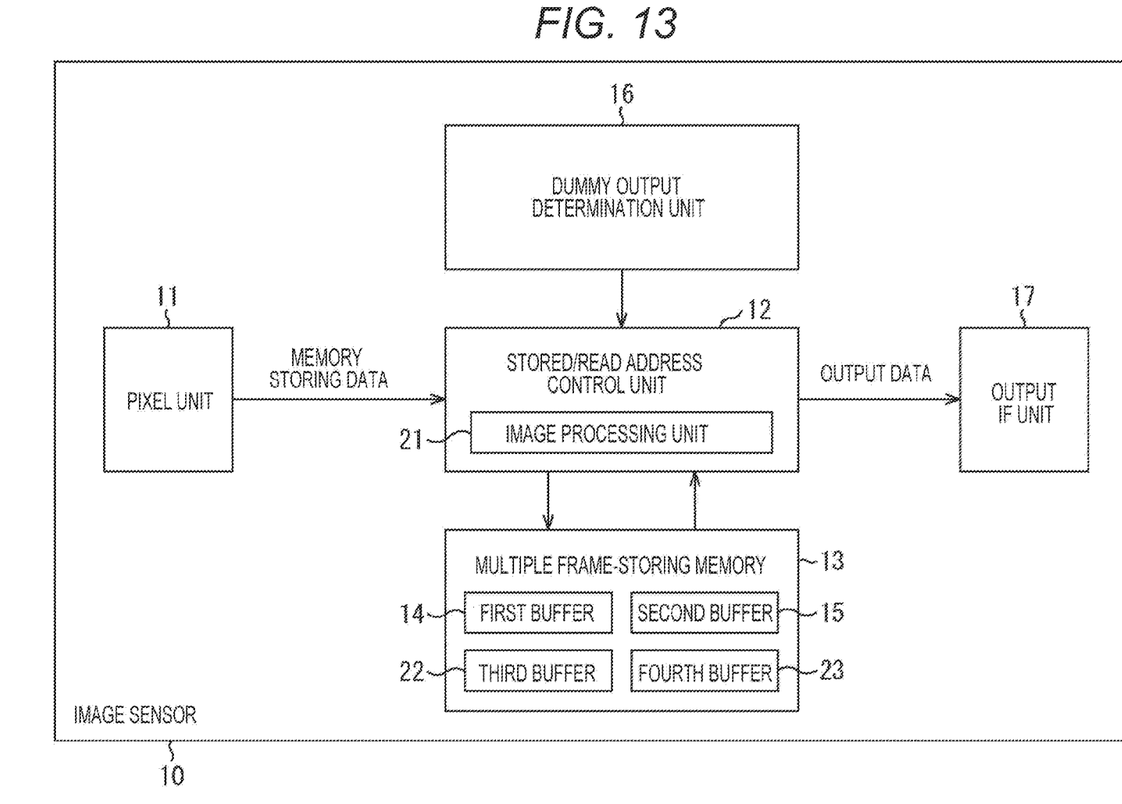
FIG. 13 is a block diagram illustrating other configuration example of the image sensor.

FIG. 13 illustrates other configuration example of the image sensor 10, which is the embodiment. As illustrated in the figure, an image processing unit 21 may be provided in the stored/read address control unit 12. The image processing unit 21 performs predetermined image processing. In addition, the stored/read address control unit 12 may be configured to be able to execute control of a plurality of stored addresses and control of a plurality of read addresses. A larger number of buffers (in a case illustrated in the figure, a third buffer 22 and a fourth buffer 23) may be provided in the multiple frame-storing memory 13.

Note that the embodiment of the present disclosure is not limited to the embodiment described above. Various modifications may be made without departing from the gist of the present disclosure.

Note that the present disclosure may have the following configurations.

(1)

An image sensor including:

a pixel unit that has a plurality of reading modes and generates image data in accordance with incident light;

a memory that has a capacity capable of storing the image data equivalent to at least two or more frames;

a control unit that simultaneously performs processing for storing the image data input from the pixel unit in a different region in the memory for each frame, and processing for reading the image data from the region where previous storage has been performed; and a detection unit that detects a change in the reading mode in the pixel unit.

(2)

The image sensor according to (1), wherein when the detection unit detects a change in the reading mode, the control unit stops processing for storing, in the memory, the image data input from the pixel unit.

(3)

The image sensor according to (1) or (2), wherein when the detection unit detects a change in the reading mode, the control unit stops processing for storing, in the memory, the image data of a corrupt frame input from the pixel unit.

(4)

The image sensor according to any of (1) to (3), wherein when the detection unit detects a change in the reading mode, the control unit performs processing for again reading the image data that has been read from the region in the memory where the image data has been previously stored.

(5)

The image sensor according to any of (1) to (4), wherein the memory includes a first buffer and a second buffer each of which is capable of storing the image data equivalent to one frame; and the control unit simultaneously performs processing for storing the image data input from the pixel unit in one of the first buffer and the second buffer in the memory for each frame, and processing for reading the image data from the other of the first buffer and the second buffer.

(6)

An electronic device including an image sensor mounted therein, the image sensor including:

a pixel unit that has a plurality of reading modes and generates image data in accordance with incident light;

a memory that has a capacity capable of storing the image data equivalent to at least two or more frames;

a control unit that simultaneously performs processing for storing the image data input from the pixel unit in a different region in the memory for each frame, and processing for reading the image data from the region where previous storage has been performed; and a detection unit that detects a change in the reading mode in the pixel unit.

REFERENCE SIGNS LIST

10 Image sensor
11 Pixel unit
12 Stored/read address control unit
13 Multiple frame-storing memory
14 First buffer
15 Second buffer
16 Dummy output determination unit
17 Output I/F unit
21 Image processing unit
22 Third buffer
23 Fourth buffer

The invention claimed is:

1. An image sensor, comprising:
a plurality of light-receiving elements;
a memory; and circuitry configured to:
generate image data based on light incident on the plurality of light-receiving elements,
wherein the plurality of light-receiving elements has a first reading mode and a second reading mode,
wherein the image data comprises
a first frame and a second frame;
concurrently store the first frame input from the plurality of light-receiving elements in a first region in the memory and read the second frame from a second region in the memory, based on no change in the first reading mode,
wherein the first region is different from the second region in which the second frame is stored prior to the storage of the first frame, and
wherein the second frame is input from the plurality of light-receiving elements prior to the input of the first frame;
detect a change in the first reading mode to the second reading mode; and
skip storage of the first frame input from the plurality of light-receiving elements and read the second frame from the second region, based on the detection of the change in the first reading mode to the second reading mode.

2. The image sensor according to claim 1, wherein the first frame is a corrupt frame input from the plurality of light-receiving elements based on the change in the first reading mode to the second reading mode.

3. The image sensor according to claim 1,
wherein the memory includes a first buffer and a second buffer,
wherein each buffer of the first buffer and the second buffer is configured to store one frame of the image data, and
wherein the first region of the memory corresponds to the first buffer and the second region of the memory corresponds to the second buffer.

4. An electronic device, comprising:
an image sensor,
wherein the image sensor comprises:
a plurality of light-receiving elements;
a memory; and
circuitry configured to:
generate image data based on light incident on the plurality of light-receiving elements,
wherein the plurality of light-receiving elements has a first reading mode and a second reading mode,
wherein the image data comprises
a first frame and a second frame;
concurrently store the first frame input from the plurality of light-receiving elements in a first region in the memory and read the second frame from a second region in the memory, based on no change in the first reading mode,
wherein the first region is different from the second region which the second frame is stored prior to the storage of the first frame, and
wherein the second frame is input from the plurality of light-receiving elements prior to the input of the first frame;
detect a change in the first reading mode to the second reading mode; and
skip storage of the first frame input from the plurality of light-receiving elements and read the second frame from the second region, based on the detection of the change in the first reading mode to the second reading mode.

* * * * *